United States Patent Office 3,825,523
Patented July 23, 1974

3,825,523
POLYMER COMPOSITION STABILIZED AGAINST OXIDATION AND LIGHT
Tadao Iwata, Motoyasu Yasawa, and Juntaro Sasaki, Iwakuni, Japan, assignors to Mitsui Petrochemical Industries, Ltd., Tokyo, Japan
No Drawing. Filed Apr. 19, 1971, Ser. No. 135,374
Int. Cl. C08f 27/00, 27/06, 27/12
U.S. Cl. 260—47 UP
6 Claims

ABSTRACT OF THE DISCLOSURE

An olefin polymer composition stabilized against oxidation and light is prepared by reacting a copolymer of an olefin and an ethylenically unsaturated alcohol with a phenol derivative of the formula

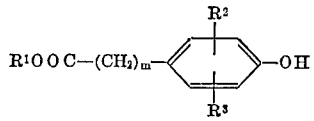

and/or an organo-sulfur compound of the formula $$R^4OOC—Z^2—S—R^5.$$

The composition is used as such or as blend with an olefin polymer.

---

This invention relates to a polymer composition consisting predominantly of an olefin polymer which is stabilized against oxidation and light.

Generally, olefin polymers lack stability to oxidation or light, and in an attempt to improve the stability, it has been the practice to add various oxidation stabilizers and light stabilizers. These stabilizers, however, have poor compatibility with olefin copolymers, and the stabilizers are driven off or dissolved out during or after the fabrication operation, and it is difficult to maintain the stabilizing effect for prolonged periods of time.

Some proposals have previously been made to fix the stabilizers chemically to the polymers in order to prevent the drive off or dissolving of the stabilizers. Most of these proposals are intended to pre-treat the olefin polymers with radiation, peroxides, or ozone to form radicals in the olefin polymers, and then reacting the polymers with radical-imparting organic compounds, followed by reaction of the polymers with stabilizers through the organic compounds for achieving the fixing. One of such methods comprises, for instance, graft polymerizing vinyl compounds containing an epoxy group to polyolefins in a manner of radical reaction, and then esterifying a carboxylic acid having a stabilizer skeleton with the epoxy group, thereby fixing the stabilizer skeleton.

In spite of the fact that the decomposition of olefin polymers occurs mainly in a manner of radical reaction, these prior proposals employ a radical initiator in their pre-treating step. Hence, the molecules of the polymers are cut more or less at this time, and it is difficult to avoid a decrease in the qaulity of the olefin polymers.

The present invention provides an olefin polymer composition having permanent and high stabilization effects which is free from the aforementioned defects.

According to the invention, there is provided an olefin polymer composition stabilized against oxidation and light, comprising a modified copolymer which is a reaction product of (a) an olefin copolymer containing a hydroxyl group wherein the polymer molecules comprise olefinic monomer units and alcoholic monomer units of formula (I)

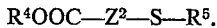

wherein $Z^1$ is an alkylene group having 1 to 15 carbon atoms, arylene group having 6 to 20 carbon atoms, cycloalkylene group having 6 to 20 atoms, or a group resulting from the bonding of these groups, and $n$ is 0 or 1;

(b) at least one stabilizer compound selected from the group consisting of phenol derivatives of formula (II)

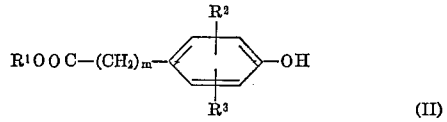

wherein $R^1$ and $R^2$ each are a hydrogen atom, an alkyl group, aryl group, or cycloalkyl group having not more than 18 carbon atoms, or a group resulting from the bonding of these groups, $R^3$ is an alkyl group, aryl group, or cycloalkyl group having not more than 18 carbon atoms, or a group resulting from the bonding of these groups, and $m$ is 0 or an integer of 1 to 5; and organo-sulfur compounds of formula (III)

$$R^4OOC—Z^2—S—R^5$$

wherein $Z^2$ is an alkylene group having 1 to 15 carbon atoms, an arylene group having 6 to 20 carbon atoms, cycloalkylene group having 6 to 20 carbon atoms, or a group derived from the combination of these groups with each other, $R^4$ is a hydrogen atom or an alkyl, aryl or cycloalkyl group having not more than 18 carbon atoms or a group derived from the combination of these groups with each other, $R^5$ is an alkyl, aryl or cycloalkyl group having not more than 18 carbon atoms or a group derived from the combination of these groups with each other, or a group expressed by the formula —$Z^2$—COOR$^6$, wherein $Z^2$ has the same meaning as defined above, and $R^6$ is an alkyl, aryl or cycloalkyl having not more than 18 carbon atoms.

One preferred embodiment of the stabilized olefin polymer composition of the present invention is an olefin polymer composition consisting substantially of the aforementioned modified olefin copolymer alone. Another embodiment of the stabilized olefin polymer composition of the invention is an olefin polymer composition wherein the polymer component consists of a mixture of the modified olefin copolymer and an olefin polymer. In this embodiment, crystalline olefin polymers are preferred for mixing with the modified olefin copolymer. Examples of such olefin polymers include homopolymers of alpha-olefins such as polyethylene, polypropylene, or 4-methyl-1-pentene, and copolymers of alpha-olefins with each other such as a copolymer of ethylene and propylene. Especially preferred olefin polymers are polyethylene and polypropylene.

The stabilized olefin polymer compositions of the present invention may contain, besides the above-mentioned polymer component, known additives such as peroxide decomposing agents, ultraviolet absorbents, slipping agents, and copper damage preventing agents.

The olefin polymer composition of the present invention will be described in greater detail below.

The olefin copolymers containing a hydroxyl group used in the present invention can be produced by various methods. One of such methods involves the vinyl copolymerization of an ethylenically unsaturated alcohol with an olefin. The copolymerization may be carried out stereoregularly using a coordination catalyst including the so-called Ziegler type catalyst, or by using the radical polymerization technique using a radical polymerization technique using a radical polymerization catalyst. One example of producing the copolymer using a coordination catalyst is disclosed in the applicants' copending U.S. application Ser. No. 856,841. According to this method, a metal derivative of an unsaturated alcohol is copolymerized with an olefin in the presence of a coordination catalyst. The ethylenically unsaturated alcohols that can be used in the copolymerization reaction described are expressed by the following formula

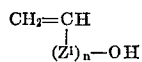

wherein $Z^1$ is an alkylene group having 1 to 15 carbon atoms, an arylene group having 6 to 20 carbon atoms, cycloalkyl group having 6 to 20 carbon atoms, or a group derived from the combination of these groups with each other, and $n$ is 0 or 1; and include, for example, allyl alcohol, 3-buten-1-ol, 4-penten-1-ol, 5-hexen-1-ol, 6-hepten-1-ol, 7-octen-1-ol, 10-undecen-1-ol, 2-methyl-3-buten-1-ol, 5-hexen-2-ol, 2-allyl phenol, 4-butenyl phenol, 2-phenyl-4-penten-1-ol, 4-vinyl phenol, and 4-vinyl cyclohexanol.

As the olefins to be copolymerized with these unsaturated alcohols, alpha-olefins such as propylene, 1-butene, 4-methyl-1-pentene, or mixtures of these, and if desired, beta-olefins or diolefins may be selected. The preferred olefins are alpha-olefins.

The olefin copolymers containing a hydroxyl group of the invention may alternatively be produced by reducing copolymers of olefins and unsaturated aldehydes or unsaturated ketones with hydrogen; or by hydrolyzing copolymers of olefins and unsaturated alcohols. For example, as disclosed in U.S. Pat. 2,386,347, an ethylene/vinyl alcohol copolymer is obtained by radical copolymerization of ethylene and vinyl acetate, and hydrolyzing the resulting copolymer.

The modified olefin copolymer of the invention is produced by reacting the olefin copolymer containing a hydroxyl group as described above with the phenol derivative of formula (II) and/or the organo-sulfur compound of formula (III). The reaction carried out here is an esterification or ester-interchange reaction, and by this reaction, the compound of formula (II) or (III) is fixed within the olefin copolymer through a chemical bond. The compound so fixed gives stability to oxidation and light to the olefin copolymer. In the present specification, the residual group of the compound of formula (II) or (III) fixedly bound to the molecules of the olefin copolymer may sometimes be termed "stabilizer skeleton."

The preferred phenol derivatives of formula (II) are those in which $R^2$ and/or or $R^3$ is an alkyl group, especially methyl or tert-butyl, and in which $R^2$ and/or $R^3$ is ortho to the hydroxyl group. Some specific examples include 3-methyl-4-hydroxybenzoic acid,
3,5-ditert-butyl-4-hydroxybenzoic acid,
3,5-dimethyl-4-hydroxybenzoic acid,
3-tert-butyl-4-hydroxybenzoic acid,
3-tert-butyl-5-methyl-4-hydroxybenzoic acid,
3-tert-butyl-6-methyl-4-hydroxybenzoic acid,
3-tert-butyl-5-ethyl-4-hydroxybenzoic acid,
3-tert-butyl-6-ethyl-4-hydroxybenzoic acid,
3-tert-octyl-4-hydroxybenzoic acid,
3-tert-octyl-5-methyl-4-hydroxybenzoic acid,
3-tert-octyl-6-methyl-4-hydroxybenzoic acid,
2-(3-methyl-4-hydroxyphenyl)acetic acid,
2-(3,5-dimethyl-4-hydroxyphenyl)acetic acid,
2-(3-tert-butyl-4-hydroxyphenyl)acetic acid,
2-(3-tert-butyl-5-methyl-4-hydroxyphenyl)acetic acid,
2-(3-tert-butyl-6-methyl-4-hydroxyphenyl)acetic acid,
2-(3-tert-butyl-5-ethyl-4-hydroxyphenyl)acetic acid,
2-(3-tert-butyl-6-ethyl-4-hydroxyphenyl)acetic acid,
2-(3-tert-octyl-4-hydroxyphenyl)acetic acid,
2-(3-tert-octyl-5-methyl-4-hydroxyphenyl)acetic acid,
2-(3-tert-octyl-6-methyl-4-hydroxyphenyl)acetic acid,
3-(3-methyl-4-hydroxyphenyl)propionic acid,
3-(3,5-dimethyl-4-hydroxyphenyl)propionic acid,
3-(3,5-ditert-butyl-4-hydroxyphenyl)propionic acid,
3-(3-tert-butyl-4-hydroxyphenyl)propionic acid,
3-(3-tert-butyl-5-methyl-4-hydroxyphenyl)propionic acid,
3-(3-tert-butyl-6-methyl-4-hydroxyphenyl)propionic acid,
3-(3-tert-butyl-5-ethyl-4-hydroxyphenyl)propionic acid,
3-(3-tert-butyl-6-ethyl-4-hydroxyphenyl)propionic acid,
3-(3-tert-octyl-4-hydroxyphenyl)propionic acid,
3-(3-tert-octyl-5-methyl-4-hydroxyphenyl)propionic acid,
3-(3-tert-octyl-6-methyl-4-hydroxyphenyl)propionic acid,
3-(3,5-didodecyl-4-hydroxyphenyl)propionic acid,
4-(3-methyl-4-hydroxyphenyl)butyric acid,
4-(3,5-dimethyl-4-hydroxyphenyl)butyric acid,
4-(3,5-ditert-butyl-4-hydroxyphenyl)butyric acid,
4-(3-tert-butyl-4-hydroxyphenyl)butyric acid,
4-(3-tert-butyl-5-methyl-4-hydroxyphenyl)butyric acid,
4-(3-tert-butyl-5-ethyl-4-hydroxyphenyl)butyric acid,
4-(3-tert-butyl-6-methyl-4-hydroxyphenyl)butyric acid,
4-(3-tert-butyl-6-ethyl-4-hydroxyphenyl)butyric acid,
4-(3-tert-octyl-4-hydroxyphenyl)butyric acid,
4-(3-tert-octyl-5-methyl-4-hydroxyphenyl)butyric acid, and
4-(3-tert-octyl-6-methyl-4-hydroxyphenyl)butyric acid.

The methyl, ethyl, propyl, butyl, octyl, dodecyl, phenyl, and cyclohexyl esters of the aforemenitoned compounds can also be used.

The preferred organo-sulfur compounds expressed by the general formula (III) are those in which $Z^2$ is an alkylene group, especially a lower alkylene group. Specific examples include butylthioacetic acid,
hexylthioacetic acid,
octylthioacetic acid,
cyclohexylthioacetic acid,
2-methylcyclohexylthioacetic acid,
2-phenylethylthioacetic acid,
3-methylthiopropionic acid,
2-methyl-3-methylthiopropionic acid,
3-butylthiopropionic acid,
2-methyl-3-butylthiopropionic acid,
3-dodecylthiopropionic acid,
2-methyl-3-dodecylthiopropionic acid,
3-phenylthiopropionic acid,
2-methyl-3-phenylthiopropionic acid,
3-benzylthiopropionic acid,
2-methyl-3-benzylthiopropionic acid,
3-(3'-methylphenylthio)propionic acid,
4-dodecylthiobenzoic acid, and
4-dodecylthiohexahydrobenzoic acid.

The methyl, ethyl, propyl, isopropyl, butyl, isobutyl, octyl, dodecyl, phenyl, and cyclohexyl esters of these compounds may also be used.

Furthermore, as the organo-sulfur compounds above, there are also used such compounds as 3,3'-didodecylthiodipropionate,
3,3'-distearylthiodipropionate,
3,3'-ditridecylthiodipropionate,
3,3'-diethylthiodipropionate, and
3,3'-dilaurylthiodipropionate.

Two or more of the compound (II) or (III) may be reacted, at one time or stepwise, with the hydroxyl-containing olefin copolymer. When the groups

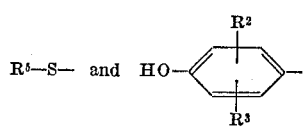

are introduced into the same molecule of the polymer, the stabilizing effect becomes superior.

The reaction of the compound of formula (II) and/or (III) with the hydroxyl-containing olefin copolymer can be carried out at a temperature of 50° to 300° C. at a reduced pressure of up to 0.001 atmosphere, or at atmospheric pressure, or a pressure up to 50 atmospheres. The reaction may be carried out in the presence of a diluent, or in the molten state in an extruder or kneader. Examples of the diluent are those used in ordinary esterification and ester-interchange reactions, such as xylene, toluene, benzene, hexane, heptane, kerosene, dimethyl formamide, and dimethyl sulfoxide.

The reaction may be efficiently performed in the presence of, as an esterification or ester-interchange catalyst, a condensing agent used in ordinary esterification or ester-interchange reactions, such as acids, for example, sulfuric acid, hydrochloric acid, phosphoric acid, or toluenesulfonic acid, amines, salts, for example, acetates, phosphates, and silicates of sodium, magnesium, manganese, zinc, palladium, cadmium, tin, and lead; metal halides such as zinc chlorides, and antimony trichloride, and alkali metal alcoholates; or a combination of these condensing agents (for example, zinc acetate and antimony trifluoride).

In order for the stabilized olefin polymer composition to exhibit good stability against oxidation and light, the content of the stabilizer skeleton should desirably be within the range of 0.001 to 1.0 mole percent based on the constituent monomeric unit of the polymer composition.

In the reaction of the olefin copolymer containing a hydroxyl group with the stabilizer compound of formula (II) or (III), the hydroxyl groups contained in the olefin copolymer may all be estified with the compound of formula (II) or (III). Some hydroxyl groups may remain unreacted. The partial remaining of the hydroxyl groups does not exert a detrimental action on stability to oxidation and light. For the same reason, in the production of a olefin copolymer containing a hydroxyl group by hydrolyzing an ethylene/vinyl acetate copolymer, it is not altogether necessary to convert the copolymer to a completely saponified product, but a partially saponified product can also be used.

As mentioned above, the stability of the stabilized olefin polymer composition of the invention depends upon the content of the stabilizer skeleton in the composition. Hence, the content of the monomeric unit of formula (I) in the olefin copolymer containing a hydroxyl group may be determined so as to meet the aforementioned requirement for the content of the stabilizer skeleton. Accordingly, in an embodiment in which the polymer component in the stabilized olefin polymer composition consists substantially of the modified olefin copolymer, the content of the monomeric unit of formula (I) is preferably within the range of 0.001 to 1.0 mole percent. In an embodiment wherein the polymer component consists of a mixture of the modified olefin copolymer and an olefin polymer, the content of the monomeric unit of formula (I) in the olefin copolymer containing a hydroxyl group preferably is 0.01 to 20 mole percent, especially 1.0 to 10 mole percent. The proportions of the modified olefin copolymer and the olefin polymer to be mixed may be determined so that the content of the stabilizer skeleton after mixing is 0.001 to 1.0 mole percent.

The mixing of the modified olefin copolymer having a stabilizer skeleton with the olefin polymer may be performed by a customary method, for instance, using a V-type blender, Banbury mixer, Henschel mixer, or kneader. The mixing of other additives such as a slipping agent can also be effected by the same method.

Since the stabilizer skeleton is fixed within the modified copolymer of the invention, it does not come off from the copolymer even when subjected to a dyeing or washing operation, but shows an excellent stabilizing effect.

The following Examples will illustrate the invention in greater detail.

EXAMPLES 1 TO 3 AND COMPARATIVE EXAMPLES 1 AND 2

A 2-liter glass polymerization vessel was charged with 800 ml. of kerosene, and after thorough purging with nitrogen, 0.6 mole of diethylaluminum chloride was put into it.

Thereafter, 0.6 mole of 10-undecen-1-ol was added dropwise over a period of 10 minutes through a dropping funnel, and the reaction was performed for 30 minutes at 70° C. Titanium trichloride (4.0 g.; Titanium Trichloride AA, Stauffer Chemical) was added, and the temperature was raised to 85° C. Propylene was introduced, and polymerized for 3 hours. After completion of the polymerization, the catalyst was decomposed with a large excess of methanol, and the product was repeatedly washed, and dried at reduced pressure at 70° C. for one day and night. There was obtained 390 g. of a copolymer of propylene and 10-undecen-1-ol containing 0.84 millimole of 10-undecen-1-ol per gram of the copolymer.

A 3-liter glass reaction vessel was charged with 1.2 liters of refined xylene, 20 g. of the copolymer, and 26 g. of ethyl 3-(3,5-ditert-butyl-4-hydroxyphenyl) propionate, and five drops of conc. sulfuric acid, and the mixture was heated under reflux for 3 hours with stirring. From the resulting liquid product, 800 ml. of xylene was driven off by distillation at atmospheric pressure, and the product was cooled to room temperature. The residual matter was poured into acetone to precipitate the product in a powdery form. The precipitate was repeatedly washed with acetone and dried under reduced pressure to yield 18.4 g. of a white powdery product.

Examination of the infrared absorption spectrum of the product indicated that the absorption of the 10-undecen-1-ol copolymer at 3350 cm.$^{-1}$ (OH of the primary alcohol) and 1055 cm.$^{-1}$ (C—O of alcohol) disappeared, and the absorptions at 3650 cm.$^{-1}$ (OH of the non-associating alcohol) and 1740 cm.$^{-1}$ (C=O of ester) appeared strongly. In addition, even when the polymer was extracted with acetone which is a good solvent for ethyl 3-(3,5-ditert-butyl-4-hydroxyphenyl) propionate at the boiling point of acetone for 24 hours, the absorption intensity at 3650 cm.$^{-1}$ and 1740 cm.$^{-1}$ was not reduced at all. Quantitative analysis using the infrared spectrum indicated that the product contained 0.63 millimol of the stabilizer per gram of the product.

The propylene/10-undecen-1-ol copolymer having the abovedescribed skeleton and a homopolymer of propylene (having an intrinsic viscosity of 2.47) of the amounts indicated in Table 1 were mixed with each other. The resulting composition was shaped into pellets, and then the pellets were made into a pressed sheet having a thickness of 0.15 mm. at 200° C. Dumbbells were punched out from the sheet, each dumbbell having a length of 70 mm., a width of 10 mm., a notched length of 30 mm., and a minimum width of 5 mm. Using the specimens obtained, the oxidation stability and the light stability were measured by the method to be described.

Test on Oxidation Stability

One end of the dumbbell specimen was held by a clip and suspended in an air circulation type hot blast oven at 150° C. The time required from then until the spontaneous break off of the dumbbell at its center owing to degradation was measured.

Test on Light Stability

One end of the dumbbell specimen was held by a clip and suspended in Sunshine Weather-O-Meter (product of Toyo Rika), and the specimen was irradiated. At every 20 hours, the dumbbell was taken out, and subjected to the bending test. The irradiation time until the breakage of the dumbbell by bending was measured.

For comparison, the same tests were performed on a composition consisting of a homopolymer of propylene and 2,6-ditert-butyl paracresol, a known stabilizer for polyolefins, and also on a homopolymer of propylene without an additive.

In order to determine the durability of the stabilizing effect of the specimen, it was extracted for 24 hours with boiling heptane using an ordinary Soxhlet extracting device, and the extraction residue was subjected the measurement of stability to oxidation.

The results are given in Table 1.

TABLE 1

| Examples | Homo-copolymer of propylene (g.) | Modified copolymer (g.) | Content of stabilizer in the composition (mmol/100 g.) | Oxidation stability of the composition (hours) Before extraction | Oxidation stability of the composition (hours) After extraction | Light stability of the composition (hours) before extraction |
|---|---|---|---|---|---|---|
| 1 | 99.28 | 0.72 | 0.45 [1] (0.019) | 200 | 200 | 240 |
| 2 | 98.55 | 1.45 | 0.91 (0.038) | 200 | 200 | 280 |
| 3 | 97.10 | 2.90 | 1.82 (0.076) | 200 | 200 | 340 |
| Comp. 1 [2] | 99.60 | (0.40) | (1.82) (0.076) | 34 | 6 | 160 |
| Comp. 2 | 100 | 0 | 0 (0) | 5 | --- | 100 |

[1] Content expressed by mole percent.
[2] Comp. (Comparative Example) 1 refers to a mere mixture of polypropylene with 2,6-ditert-butyl paracresol (hence, the stabilizer skeleton is not fixed to polypropylene).

It is clear from the results shown in the table that the stabilized olefin polymer composition of the present invention has far superior stability to oxidation and light, to the comparative specimens. It is especially noteworthy that the composition of the invention retains good stability to oxidation even after extraction, whereas the extraction of the specimen in Comparative Example 1 resulted in the removal of the stabilizer, and its oxidation stability was reduced to the level equivalent to that of polypropylene alone.

EXAMPLE 4

A 1-liter glass reaction vessel was charged with 500 ml. of refined benzene, 50 g. of propylene/10-undecen-1-ol copolymer (with a 10-undecen-1-ol content of 1.0% by weight) obtained in the same way as set forth in Example 1, 10 g. of methyl 3,5-dimethyl-4-hydroxybenzoate, and one drop of concentrated sulfuric acid, and heated under reflux for 3 hours. The product was distilled at atmospheric pressure to remove 100 ml. of benzene, and then washed repeatedly with a large excess of acetone to yield 49.2 g. of a final product, which is a propylene/10-undecen-1-ol copolymer having the stabilizer skeleton.

A press sheet having a thickness of 0.15 mm. was shaped at 200° C. from this sheet, and dumbbells of the same sizes as in Example 1 were punched out from the sheet. The oxidation stability was measured using the specimen obtained. The dumbbell was not broken even after a lapse of 200 hours.

EXAMPLE 5

A 2-liter glass reaction vessel was charged with one liter of kerosene, and 570 millimols of ethylaluminum sesquichloride, and 650 millimols of titanium tetrachloride was added dropwise at below room temperature over a period of 30 minutes. The temperature was then raised to 40° C., and the reaction was performed for 3 hours. The resulting precipitate was separated by decantation, and washed several times with kerosene. The suspension obtained was heated at 140° C. for 2 hours for use as a catalyst component. The concentration of trivalent titanium, as measured by titration, was found to be 0.864 mole/liter.

A 500 ml. glass polymerization vessel was charged with 250 ml. of kerosene, 10 millimoles of the catalyst component obtained above and 50 millimoles of $$C_2H_5Al[O(CH_2)_3CH=CH_2]Cl$$

The temperature was raised to 70° C., and propylene was polymerized at 70° C. for 60 minutes. Thereafter, the catalyst was decomposed with a methanol/hydrochloric acid mixture, and the product was repeatedly washed to yield 65 g. of a propylene/4-penten-1-ol copolymer having a 4-penten-1-ol content of 0.10 millimole per gram of the copolymer.

A 5-liter glass reaction vessel was charged with 3 liters of refined xylene, 50 g. of the propylene/4-penten-1-ol copolymer, 10 g. of 3-(3,5-ditert-butyl - 4 - hydroxyphenyl) propionic acid, and 5 drops of conc. sulfuric acid, and heated at 130° C. for 3 hours with stirring. The product was then treated in the same way as mentioned in Example 1 to give 49.6 g. of a white powdery product, which is a propylene/4-penten-1-ol copolymer.

Thirty grams of the propylene/4-penten-1-ol having the stabilizer skeleton was then mixed with 0.05 g. of distearylthiodipropionate to form a composition. A press sheet having a thickness of 0.15 mm. was shaped from this composition at 200° C. Dumbbells of the same sizes as in Example 1 were punched out from the sheet, and the same test as to oxidation stability as in Example 1 was performed. It was found that the dumbbell was not broken even after a lapse of 200 hours.

EXAMPLE 6

A 3-liter glass reaction vessel was charged with 1.5 liters of refined xylene, 20 g. of the propylene/10-undecen-1-ol copolymer obtained in Example 1, 13 g. of ethyl 3-(3,5 - ditert-butyl - 4 - hydroxyphenyl)propionate, 10 g. of ethyl 3-dodecylthiopropionate, and 3 drops of conc. sulfuric acid, and heated under reflux for 3 hours with stirring. The product was treated in the same way as in Example 1 to yield 19.1 g. of a white powdery product which is a propylene/10-undecen-1-ol copolymer having the stabilizer skeleton. 1.5 g. of this copolymer was mixed with 100 g. of a homopolymer of propylene (having an intrinsic viscosity of 1.86), and the mixture pelletized. The pellets were extruded through a nozzle at 260° C. to form 5 denier filaments. The stability of the filaments before and after drycleaning (in a trichloroethylene bath) was measured in an air circulation type hot blast oven at 150° C. It took more than 200 hours before the breaking of the filaments.

On the other hand, filaments of 5 denier was produced from a composition consisting of a homopolymer of propylene, 0.4% by weight of 2,6-ditert-butyl paracresol, and 0.2% by weight of dilaurylthiodipropionate. The stability of the filaments before and after dry cleaning was determined in the same way. It was found that the filaments broke in 120 hours after start of the test (before dry cleaning), and in 30 hours (after dry cleaning).

EXAMPLE 7

A composition was prepared by mixing 1.5 g. of the propylene/10-undecen-1-ol copolymer containing the stabilizer skeleton obtained in Example 1 with 100 g. of polyethylene. The content of stabilizer skeleton in the composition was 0.9 mmole/100 g. (0.0276 mol percent). A press sheet was formed from the composition, and dumbbells were shaped. The oxidation stability of the dumbbells was measured in the same way as set forth in Example 1 in a hot blast oven at 125° C. It took more than 500 hours before the breaking of the dumbbell. The dumbbells exhibited the same stability even after extraction with boiling heptane.

A homopolymer of ethylene containing no stabilizer was broken in the above test in 40 hours.

A dumbbell specimen of an ethylene homopolymer having incorporated therein 0.2% by weight (0.026 mole percent) of 2,6-ditert-butyl paracresol did not break for more than 500 hours in the above test, but after extraction with boiling n-heptane, it broke in 60 hours.

EXAMPLE 8

A composition was prepared by mixing 2.5 g. of the propylene/10-undecen-1-ol having the stabilizer skeleton obtained in Example 1 with 100 g. of a 4-methyl-1-pentene polymer. Dumbbells were formed from the composition. The oxidation stability of the dumbbells was measured in the same way as set forth in Example 1 in a hot blast oven at 125° C. It was found that it took more than 100 hours until the breakage of the dumbbell, and the stability was not changed even after extraction with n-heptane.

On the other hand, a dumbbell specimen of a polymer of 4-methyl-1-pentene having no stabilizer broke in 20 hours, and a specimen of a composition consisting of a 4-methyl-1-pentene polymer and 0.3% by weight of 2,6-ditert-butyl paracresol broke in 70 hours. After extraction with acetone, the latter specimen broke in 30 hours.

EXAMPLE 9

A 5-liter glass reaction vessel was charged with one liter of benzene, one liter of a 10% aqueous solution of potassium hydroxide, and 50 g. of commercially available ethylene/vinyl acetate copolymer (containing 3.84 millimoles of vinyl acetate unit per gram of the copolymer), and heated under reflux for 3 hours. Subsequent steam distillation of the crude product gave 32.8 g. of an ethylene/vinyl alcohol copolymer containing 4.3 millimoles of hydroxyl groups per gram of the copolymer (with a degree of saponification of about 94%).

A one-liter glass reaction vessel was charged with 300 ml. of refined xylene, 1 g. of the ethylene/vinyl alcohol copolymer obtained above, 6.6 g. of ethyl 3-(3,5-ditert-butyl-4-hydroxyphenyl)propionate, and 0.2 g. of paratoluenesulfonic acid, and heated under reflux for 6 hours. After completion of the reaction, a large excess of acetone was added to precipitate the product. There was obtained 0.9 g. of a slightly yellowish white powdery product. By the infrared absorption spectrum it was confirmed that this product is an ethylene/vinyl alcohol copolymer containing 2.8 millimoles/g. of the stabilizer skeleton.

A composition was prepared by mixing 0.5 g. of this product with 50 g. of a homopolymer of propylene (having an intrinsic viscosity of 2.10). Dumbbells were produced in the same way as in Example 1, and the oxidation stability was examined in the same way. It was found that the specimen dumbbell did not break even after a lapse of 200 hours.

EXAMPLE 10

A 5-liter glass reaction vessel was charged with one liter of benzene, one liter of a 10% aqueous solution of potassium hydroxide, and 50 g. of commercially available ethylene/vinyl acetate copolymer (containing 3.84 millimoles of vinyl acetate per gram of the copolymer), and then heated under reflux for 1 hour. Subsequent steam distillation of the crude product gave 40.4 g. of an ethylene/vinyl/acetate/vinyl alcohol copolymer having 2.4 millimoles of hydroxyl groups per gram of the copolymer, and also having a saponification degree of about 50%.

A one-liter glass reaction vessel was charged with 300 ml. of refined xylene, 1 g. of the ethylene/vinyl acetate/vinyl alcohol copolymer obtained above, 6.6 g. of ethyl 3-(3,5-ditert-butyl-4-hydroxyphenyl) propionate, and 0.2 g. of paratoluenesulfonic acid, and then heated under reflux for 6 hours. After completion of the reaction, a large excess of acetone was added to precipitate the product. There was obtained 0.9 g. of a slightly yellowish white powdery product. By the infrared absorption spectrum, it was confirmed that this product is an ethylene/vinyl acetate/vinyl alcohol copolymer containing 1.0 millimol/g. of the stabilizer skeleton.

A composition was prepared by mixing 0.5 g. of this product with 50 g. of a homopolymer of propylene having an intrinsic viscosity of 2.10. Dumbbells were made in the same way as in Example 1, and the oxidation stability was examined in the same way. It was found that the dumbbell did not break even after a lapse of 200 hours.

What we claim is:

1. A modified copolymer which is an esterification or ester-interchange reaction product of
   (a) an olefin copolymer containing a hydroxyl group wherein the polymer molecules comprise olefinic monomer units selected from ethylene and propylene and alcoholic monomer units of formula (I)

wherein $Z^1$ is an alkylene group having 1 to 15 carbon atoms, arylene group having 6 to 20 carbon atoms, cycloalkylene group having 6 to 20 carbon atoms, or a group resulting from the bonding of these groups, and $n$ is 0 or 1; and
   (b) a stabilizer compound comprising a phenol derivative of formula (II)

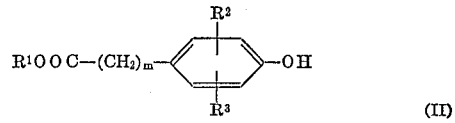

wherein $R^1$ and $R^2$ are each a hydrogen atom, an alkyl group, aryl group, or cycloalkyl group having not more than 18 carbon atoms, or a group resulting from the bonding of these groups, $R^3$ is an alkyl group, aryl group, or cycloalkyl group having not more than 18 carbon atoms, or a group resulting from the bonding of these groups, and $m$ is 0 or an integer of 1 to 5, the amount of the stabilizer in said composition being 0.001–1.0 mol percent based on the constituent monomeric unit said esterification or ester-interchange reaction taking place at a temperature of 50°–300° C. and at a pressure of 0.001–50 atmospheres.

2. The composition of claim 1 wherein said esterification or ester-interchange reaction is carried out in the presence of an inert diluent.

3. The composition of claim 2 wherein said diluent is selected from the group consisting of xylene, toluene, benzene, hexane, heptane, kerosene, dimethyl formamide, and dimethyl sulfoxide.

4. The composition of claim 1 wherein said esterification or ester-interchange reaction is carried out in the presence of a conventional esterification catalyst.

5. The composition of claim 4 wherein said catalyst is an acid selected from the group consisting of sulfuric acid, hydrochloric acid, phosphoric acid and toluenesulfonic acid.

6. The composition of claim 1 wherein said esterification or ester-interchange reaction are carried out with said reactants (a) and (b) in the molten state.

References Cited

UNITED STATES PATENTS 3,112,338   11/1963   Smutney  ------------ 260—473
3,168,492   2/1965   Doyle  ------------ 260—45.85

OTHER REFERENCES

Chem. Abst., vol. 58, 1597h (1963).

JOSEPH L. SCHOFER, Primary Examiner

C. A. HENDERSON, JR., Assistant Examiner

U.S. Cl. X.R.

260—79.5 NV, 79.7, 88.1 R, 897 A

UNITED STATES PATENT OFFICE
CERTIFICATE OF CORRECTION

Patent No. 3,825,523　　　　　　　　Dated July 23, 1974

Inventor(s) Iwata, et al.

It is certified that error appears in the above-identified patent and that said Letters Patent are hereby corrected as shown below:

In the heading, insert:

-- Claims priority, application Japan, filed
       April 22, 1970, No. 70/33851 --

Signed and sealed this 29th day of October 1974.

(SEAL)
Attest:

McCOY M. GIBSON JR.　　　　　　　　C. MARSHALL DANN
Attesting Officer　　　　　　　　　Commissioner of Patents